United States Patent
Lebreton et al.

(10) Patent No.: US 12,556,778 B2
(45) Date of Patent: Feb. 17, 2026

(54) VIDEO PLAYER, VIDEO PLAYBACK METHOD, AND PROGRAM

(71) Applicant: NIPPON TELEGRAPH AND TELEPHONE CORPORATION, Tokyo (JP)

(72) Inventors: Pierre Lebreton, Tokyo (JP); Kazuhisa Yamagishi, Tokyo (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/847,894

(22) PCT Filed: Mar. 23, 2022

(86) PCT No.: PCT/JP2022/013616
§ 371 (c)(1),
(2) Date: Sep. 17, 2024

(87) PCT Pub. No.: WO2023/181205
PCT Pub. Date: Sep. 28, 2023

(65) Prior Publication Data
US 2025/0203173 A1    Jun. 19, 2025

(51) Int. Cl.
*H04N 21/647* (2011.01)
(52) U.S. Cl.
CPC ................ *H04N 21/64792* (2013.01)
(58) Field of Classification Search
None
See application file for complete search history.

(56) References Cited

U.S. PATENT DOCUMENTS

| | | | |
|---|---|---|---|
| 10,958,586 B2 * | 3/2021 | Jana | H04L 47/30 |
| 11,425,394 B2 * | 8/2022 | Zhou | H04N 19/103 |

(Continued)

FOREIGN PATENT DOCUMENTS

| | | | | |
|---|---|---|---|---|
| CN | 112690005 A | * | 4/2021 | ......... H04N 21/4622 |
| JP | 2019016961 A | * | 1/2019 | |
| KR | 20210126566 A | * | 10/2021 | ........... H04N 19/597 |

OTHER PUBLICATIONS

Huang et al. (2014) "A Buffer-Based Approach to Rate Adaptation: Evidence from a Large Video Streaming Service" ACM SIGCOMM, Aug. 17, 2014.

(Continued)

*Primary Examiner* — William J Kim

(57) ABSTRACT

A video player includes a processor; and a memory that includes instructions, which when executed, cause the processor to execute the following steps: predicting a future throughput by using a past throughput value; configuring a search space for identifying a quality adaptation schedule; extracting a plurality of paths in the search space; estimating, based on the future throughput, a quality of experience value for each path of the extracted plurality of paths; identifying a path corresponding to a highest quality of experience value from among the estimated quality of experience values, as the quality adaptation schedule; determining, based on the quality adaptation schedule, a quality value of a chunk to be requested for the future unit time interval subsequent to the current unit time interval; requesting the chunk with the determined quality value; and receiving the chunk with the determined quality value.

15 Claims, 5 Drawing Sheets

(56) References Cited

U.S. PATENT DOCUMENTS

| | | | |
|---|---|---|---|
| 11,621,985 B2* | 4/2023 | Bentaleb | H04N 21/44209 |
| | | | 709/217 |
| 2016/0112732 A1* | 4/2016 | Li | H04N 21/2385 |
| | | | 725/116 |
| 2017/0026713 A1* | 1/2017 | Yin | H04N 21/643 |
| 2020/0067852 A1* | 2/2020 | Sen | H04L 65/752 |
| 2020/0099733 A1* | 3/2020 | Chu | H04N 21/2385 |
| 2022/0132139 A1* | 4/2022 | Zhou | H04N 19/189 |

OTHER PUBLICATIONS

Yin et al. (2015) "A Control-Theoretic Approach for Dynamic Adaptive Video Streaming over HTTP" ACM SIGCOMM, Aug. 17, 2015, pp. 325-338.

Yan et al. (2020) "Learning in situ: a randomized experiment in video streaming" 17th USENIX Symposium on Networked Systems Design and Implementation (NSDI '20), Feb. 25, 2020.

Mao et al. (2017) "Neural Adaptive Video Streaming with Pensieve" ACM SIGCOMM '17, Aug. 21, 2017, pp. 197-210.

Wu et al. (2020) "Adversarial Sparse Transformer for Time Series Forecasting" 34th Conference on Neural Information Processing Systems (NeurIPS 2020), Dec. 6, 2020, pp. 1-11.

Yamagishi and Hayashi (2017) "Parametric Quality-Estimation Model for Adaptive-Bitrate-Streaming Services" IEEE Transactions on Multimedia, vol. 19, No. 7, pp. 1545-1557.

* cited by examiner

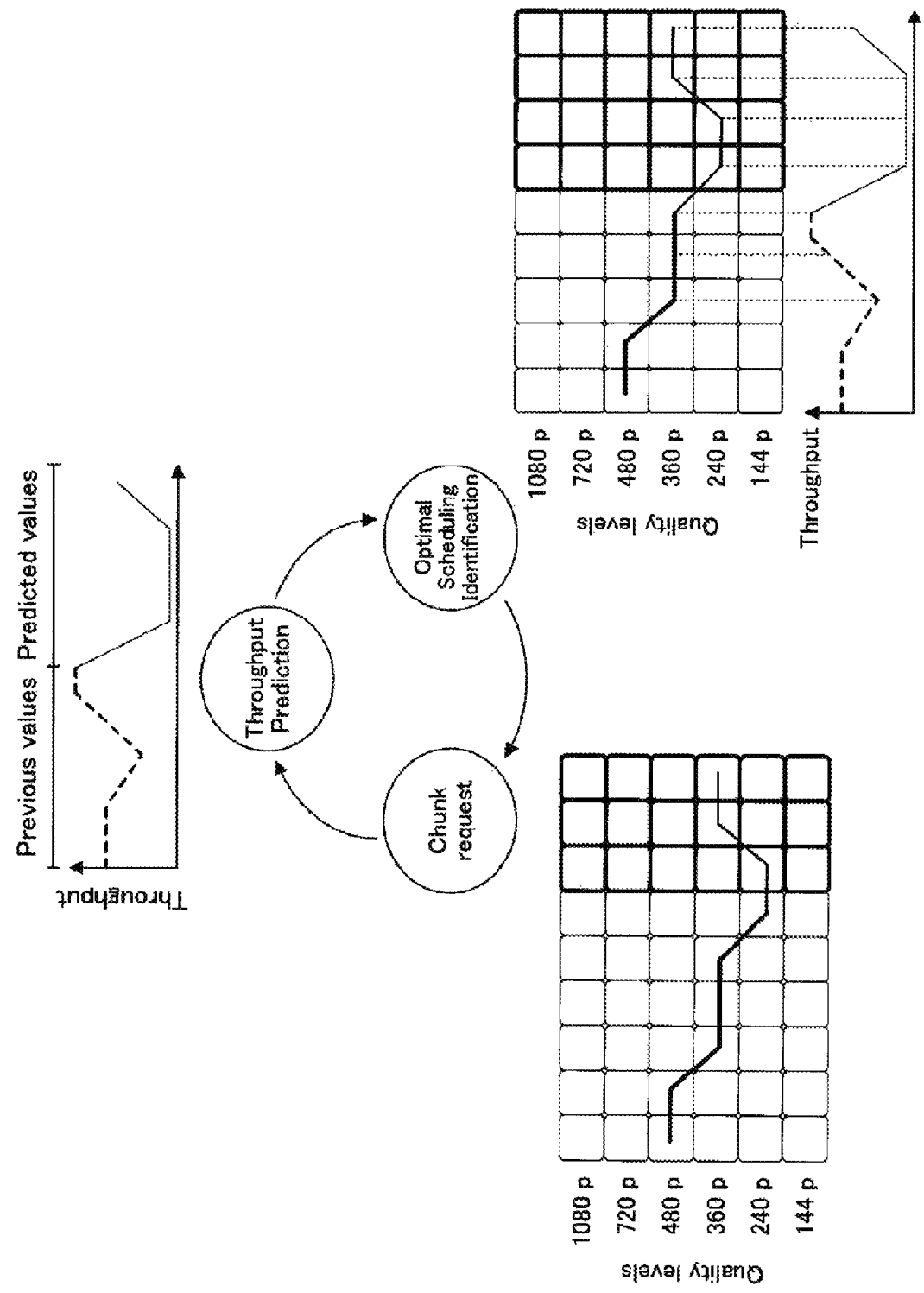
[Fig. 1]

[Fig. 2]
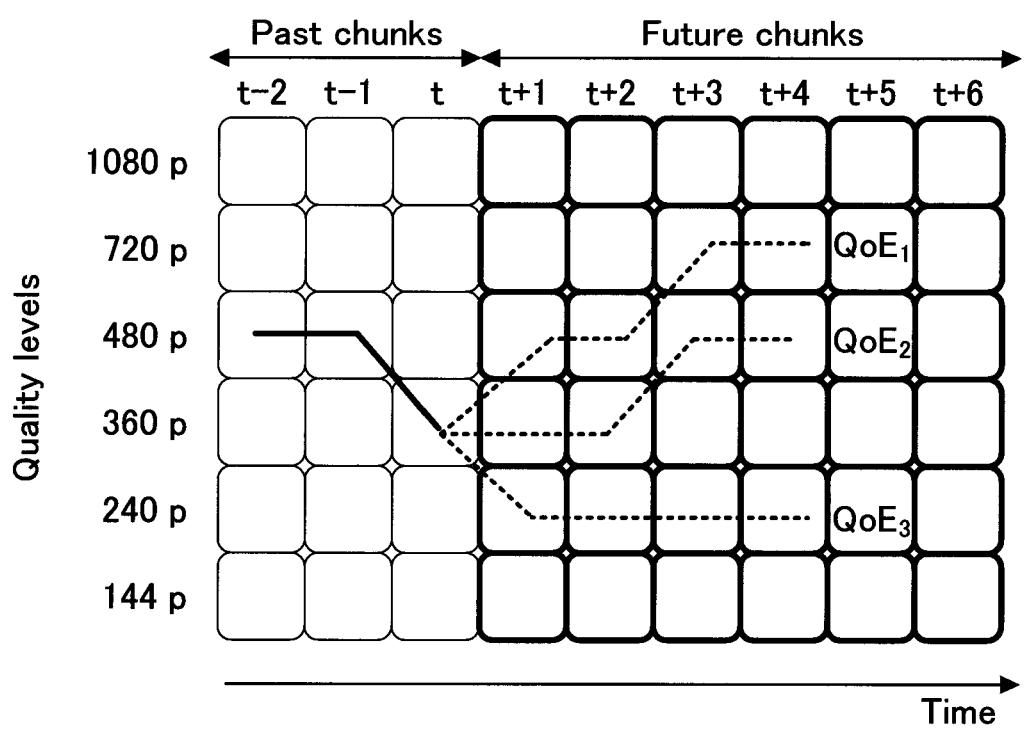

[Fig. 3]
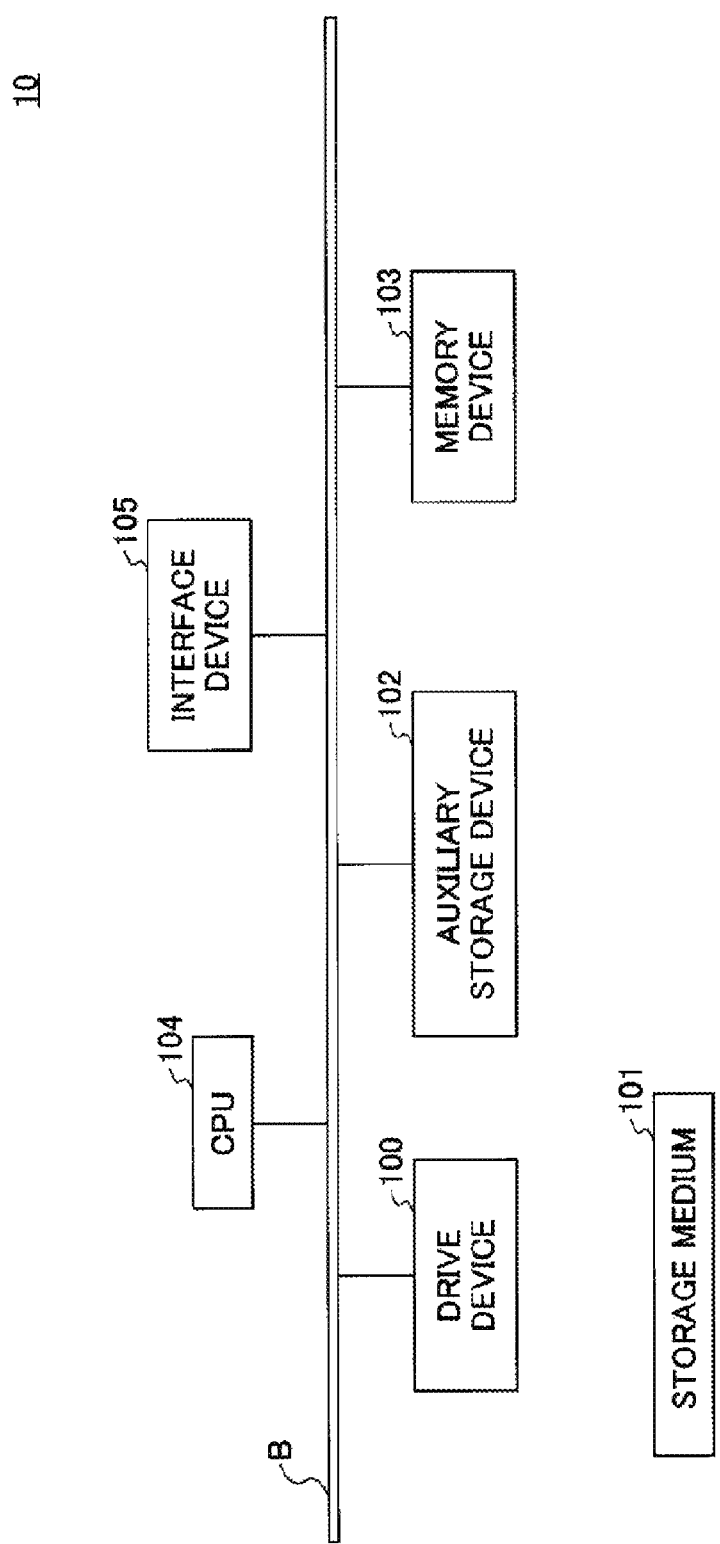

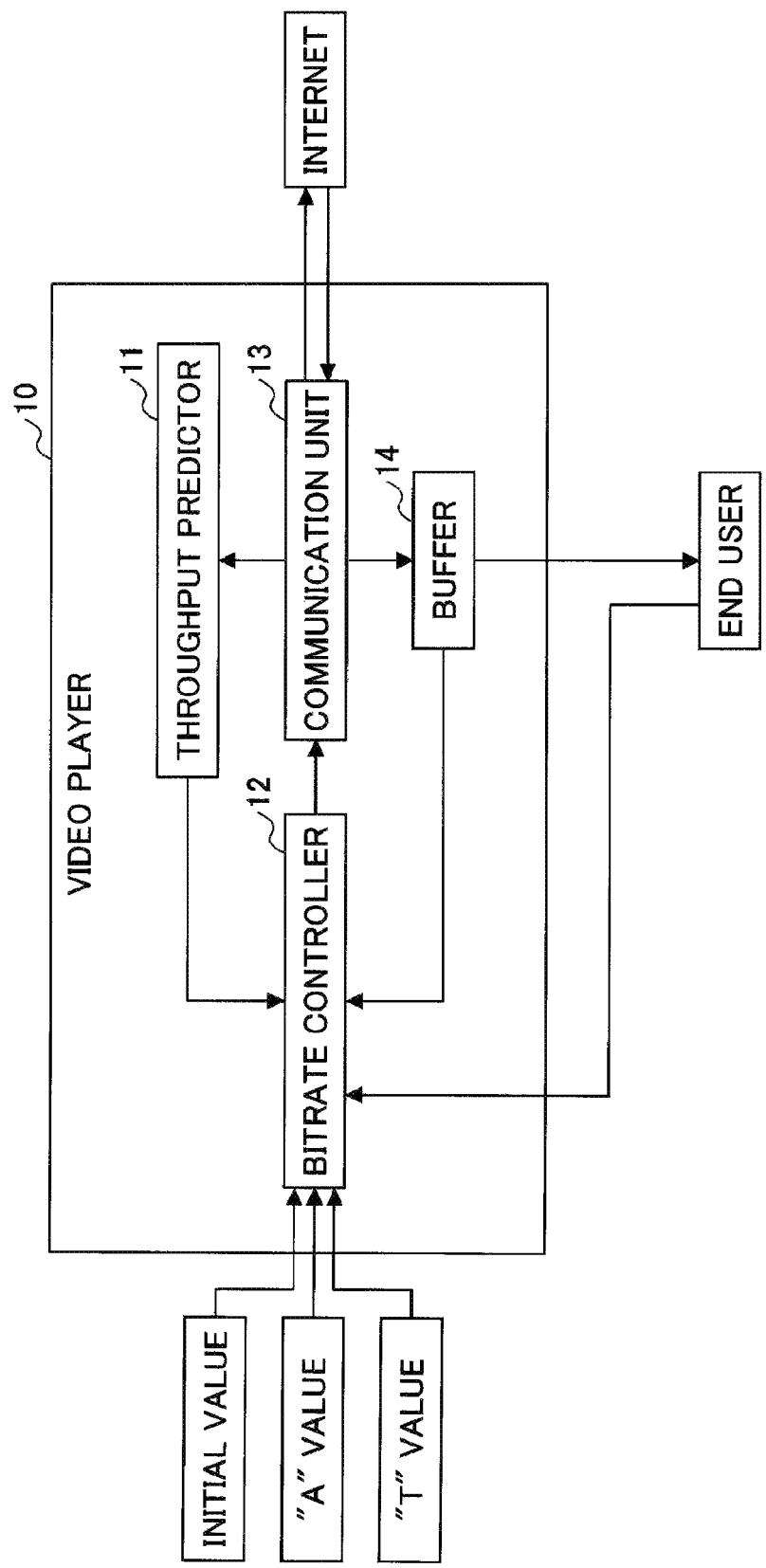

[Fig. 5]
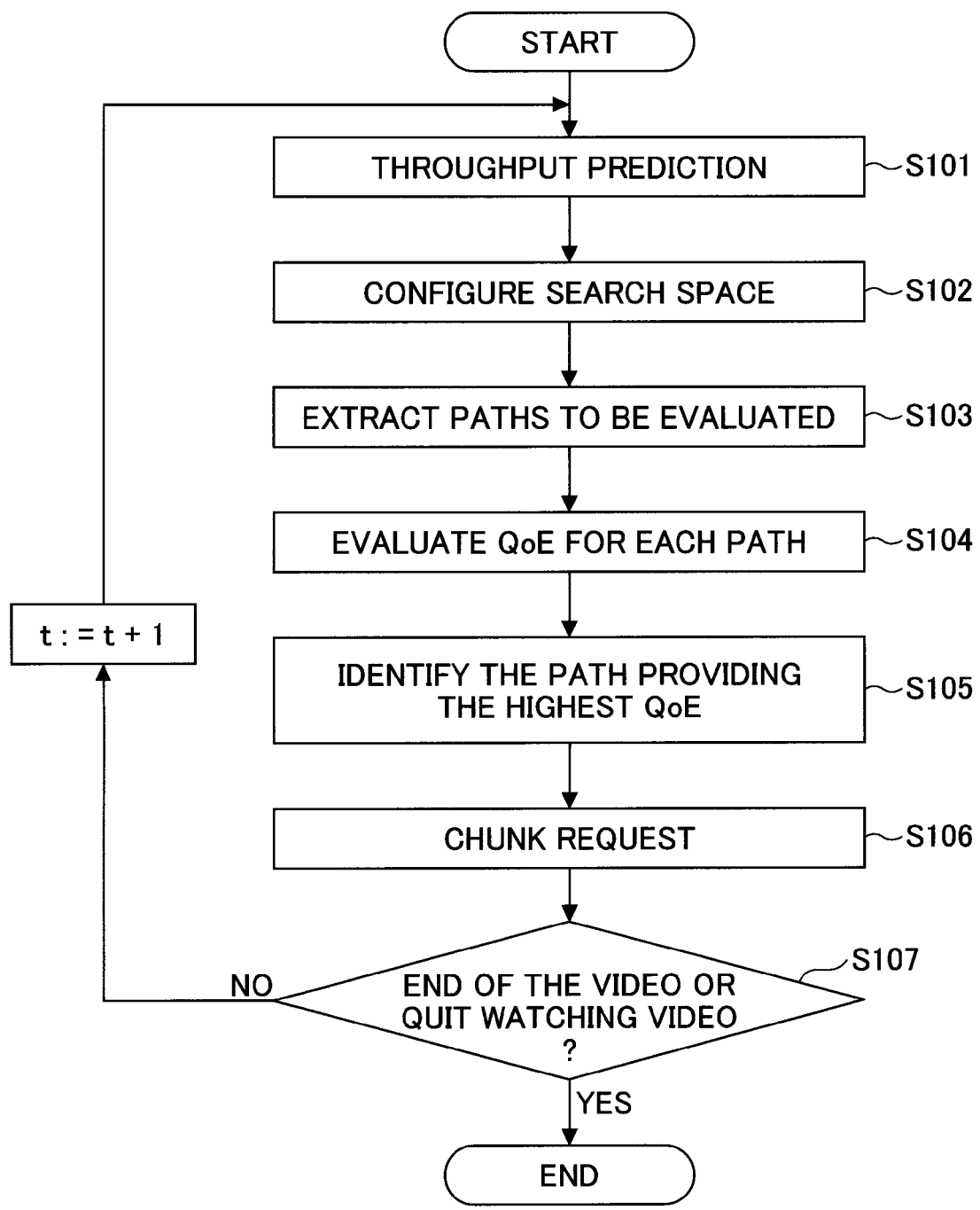

VIDEO PLAYER, VIDEO PLAYBACK METHOD, AND PROGRAM

CROSS-REFERENCE TO RELATED APPLICATIONS

This application is a U.S. 371 Application of International Patent Application No. PCT/JP2022/013616, filed on 23 Mar. 2022, the disclosure of which is hereby incorporated herein by reference in its entirety.

TECHNICAL FIELD

The present invention relates to a video player, a video playback method, and a program.

BACKGROUND ART

Streaming videos to a large audience is challenging. Each user has an Internet access with different capabilities having different available throughput which also vary as a function of time. Therefore, to stream videos to all users, it is needed to make use of different representations (videos encoded at various resolution, bitrate and frame rate value) so to allow to adapt the bitrate requirements of the videos to match with the available throughput of the users. Such method of adapting quality to the available throughput is referred to adaptive bitrate video streaming.

In the process of adaptive bitrate (ABR) streaming, the video player is presented with different representation which have different throughput requirements. The entire videos are decomposed in multiple segments of videos called chunks, and allow adjusting the video quality on the per-chunk basis. The video player have then the task to provide the highest quality of experience (QoE) by selecting an appropriate sequence of chunks so to maximize the coding quality, while also avoiding frequent quality changes and buffer depletion which would result in stalling. To achieve this goal, there are two main factors that need to be considered: first, it is needed to define a proper rule for the chunk request decision mechanism, and second, as the chunk selection may depends on throughput estimation, accurate throughput prediction is needed so to ensure proper chunk selection.

CITATION LIST

Non Patent Literature

[NPL 1] T.-Y. Huang, R. Johari, N. Mckeown, M. Trunnell, and M. Watson, "A buffer-based approach to rate adaptation: Evidence from a large video streaming service," in SIGCOMM, 2014.
[NPL 2] X. Yin, A. Jindal, V. Sekar, and B. Sinopoli, "A control-theoretic approach for dynamic adaptive video streaming over HTTP," in Proceedings of the 2015 Conference of the ACM SIGCOMM, 2015, p. 325-338.
[NPL 3] Yan, Ayers, Zhu, Fouladi, Hong, Zhang, Levis and Winstein, "Learning in situ: a randomized experiment in video streaming," 17th USENIX Symposium on Networked Systems Design and Implementation (NSDI '20), 2020
[NPL 4] Mao, Netravali, and Alizadeh, "Neural Adaptive Video Streaming with Pensieve," Proceedings of the Conference of the ACM Special Interest Group on Data Communication, 2017
[NPL 5] Wu, Sifan and Xiao, Xi and Ding, Qianggang and Zhao, Peilin and Wei, Ying and Huang, Junzhou, "Adversarial Sparse Transformer for Time Series Forecasting," Advances in Neural Information Processing Systems, 2020
[NPL 6] Kazuhisa Yamagishi and Takanori Hayashi, Parametric Quality-Estimation Model for Adaptive-Bitrate-Streaming Services, IEEE Transactions on Multimedia, 2017

SUMMARY OF INVENTION

Technical Problem

Although many researches have been performed on the study of these rules for chunk packet selection, a limitation of these previous works is in the time scale considered in the chunk selection. Indeed, previous works have been focusing on the selection of the immediately following chunk as it relates to the problematic that video players have: "which chunk should be requested next."

However, having this short-sighted view result in non-optimal QoE as it does not allow to anticipate degradation of network access and only provide a response to observed degradations events.

As an illustration, one could consider the case of a user watching video in a car. At a given time, a user may enjoy a high-quality network access allowing him to watch high quality videos. However, when the car enters a tunnel, the available throughput decreases significantly. In this context, the traditional "short-sighted" video player has no other choice than largely dropping the video quality to avoid stalling as at the time at which the video players measure the drop in throughput, the player is left without any other options.

There is a need for a video playback technique that allows enhancing user's quality of experience in challenging network conditions.

Solution to Problem

According to an aspect of the present invention, there is provided a video player including a transmitter; a receiver; a processor; and a memory that includes instructions, which when executed, cause the processor to execute the following steps: predicting a future throughput for a future first time interval by using a past throughput value, the future first time interval including m future unit time intervals; configuring a search space for identifying a quality adaptation schedule, the search space being defined by k quality values, and a second time interval including a current unit time interval, the m future unit time intervals, and n past unit time intervals; extracting a plurality of paths in the search space, each path of the plurality of paths being obtained by selecting one quality level from the k quality levels for each unit time interval included in the second time interval; estimating, based on the future throughput, a quality of experience value for each path of the extracted plurality of paths; identifying a path corresponding to a highest quality of experience value from among the estimated quality of experience values, as the quality adaptation schedule; determining, based on the quality adaptation schedule, a quality value of a chunk to be requested for the future unit time interval subsequent to the current unit time interval; requesting the chunk with the determined quality value through the transmitter; and receiving the chunk with the determined quality value through the receiver.

Advantageous Effects of Invention

According to an embodiment, a video playback technique is provided that allows enhancing user's quality of experience in challenging network conditions.

BRIEF DESCRIPTION OF DRAWINGS

FIG. 1 is a diagram illustrating an example of main steps of a chunk scheduling algorithm according to an embodiment.

FIG. 2 is a diagram illustrating an example of a comparison of QoE values between different quality adaptations FIG. 3 is a diagram illustrating a hardware configuration of a video player 10 according to an embodiment.

FIG. 4 is a diagram illustrating a functional configuration of the video player 10 according to an embodiment.

FIG. 5 is a flowchart for illustrating an example of a procedure executed by the video player 10.

DESCRIPTION OF EMBODIMENTS

In the following an overview on the different type of algorithm is introduced. These can be categorized into two main categories: the rule-based ABR models and the learning-based ABR models. In the first category, the decision-making process for the chunk selection is based on hand-crafted rules, while the second category make use of reinforcement learning in order to define the chunks to be requested.

Among the rule-based ABR models, two main type of models exists: the ones that make use of only buffer filling rate information in order to make the chunk request decisions, and the algorithms that also use throughput prediction. Regarding the buffer only-based methods, in Non Patent Literature 1 a method is proposed to request chunks depending on a linear function of the buffer filling rate. As buffer gets filled, higher quality chunks are requested. On the other hand, if buffer filling rate reaches low levels, low quality videos are requested in order to avoid stalling. Such method takes into account a cushion so to ensure that when higher quality levels are only requested when buffer filling rate reached a minimum level so to avoid buffer depletion caused by too aggressive high quality chunk requests.

Using a linear relationship between buffer filling rate and selected chunk may not provide an optimal solution as there is a non-linear relationship between video bitrate and quality. Therefore, in the algorithm BOLA has been proposed. In this algorithm, chunks are selected based on the buffer filling rate thresholds. Once a buffer filling rate reaches a certain filling rate level, a pre-defined given quality level is selected. The process of defining threshold is done per-video content using information on video bitrate and corresponding quality of the different representations at which the video is available. The previously introduced methods only takes into account buffer filling rate to select chunks. However, methods that also take into account throughput information have also been considered. The idea behind these methods is to use knowledge about past downloaded chunks to get an estimate of the future throughput, and select chunks based on the predicted ability of the video player to download in time chunks considering the available network conditions.

The most simplistic approach is the rate-based only algorithm. With this method, chunks are selected so that the required bitrate for the selected chunk is immediately lower than the estimated throughput. However, one of the limitations of such approach is that it may results in frequent changes in quality which would result in lower QoE as past studies have shown that users prefer stable quality over fluctuating quality. Therefore, accounting for the effect of quality fluctuations and buffer information (to account for stalling), the Model Predictive Control (MPC) approaches have been proposed (Non Patent Literature 2).

The general idea of such type of ABR control mechanism is to optimize a QoE evaluation function which is given by the linear summation of three QoE-related factors: the quality of the chunk that is going to be requested, the smoothness of the quality changes between consecutive chunks, and stalling and initial loading delay durations. Future throughput is then estimated, and chunks are selected so to maximize quality and minimize quality changes and stalling.

One of the challenges with such method is the ability to predict future throughput values. To address this problem, different models derived from the base MPC algorithm were proposed. In Non Patent Literature 2 throughput prediction was performed using a harmonic mean. Then, in Non Patent Literature 2, the authors also provided an alternative approach called RobustMPC which take into account past throughput prediction error to weight the predicted throughput values allowing decreasing cases of throughput over-prediction.

In Non Patent Literature 3 an algorithm called Fugu is proposed and make use of deep neural network (DNN) to predict transmission time. This algorithm uses features such as past chunk size, past transmission times, Transmission Control Protocol (TCP) statistics (congestion window, un-acknowledged packets, round trip time (RTT), TCP estimated throughput) to estimate the time needed to download chunks of different quality. Based on these estimated values, the MPC rule weighting quality, quality variation and stalling-related events can be applied to make the decision of which chunk need to be selected to provide the highest experience to the users.

BayesMPC proposes to model throughput using a learned Bayesian Neural Network. With this approach, distribution of throughput values is predicted and allows to take a probabilistic view on the chunk selection algorithm while still using the base MPC rule. Finally, hidden Markov model (HMM) have also been proposed as a way to perform throughput prediction.

Alternatively to the handcrafted rule-based ABR model, previous work have considered the use of reinforcement learning for chunk selection mechanism. Pensieve (Non-Patent Literature 4) has been a precursor for such type of models. The general idea of the algorithm is that rules such as the one defined for MPC can be seen as arbitrary and may be subject to human error when designing those rules.

For example, the weighting between requesting a high-quality chunk and aiming to maintain a constant quality was left as a free parameter, and setting this value may not be an easy task. Furthermore, stalling features was only considered in terms of stalling duration which was linearly combined with coding quality related features which can also be seen as arguable.

Therefore, instead of requiring hand-crafted rule for the chunk selection process, it is proposed to use data-driven techniques to learn what rule should be used to define which chunk needs to be requested.

Pensieve (Non-Patent Literature 4) takes then information on buffer filling rate, data on past experienced throughput and past requested chunk size to predict directly which chunk that be selected. However, it should be worth mentioning that the training was based on a loss using MPC's objective function. Although, Pensieve (Non-Patent Literature 4) does not rely on throughput prediction, an extension was proposed by the authors, and a new model which leverage throughput prediction information was proposed to enhance the performance of the algorithm.

Then, further extensions of these type of models have considered by using Generative Adversial Networks (GANs). An instantiation of this type of models can be found in the model Tiyuntsong. With this type of model, the idea is to not rely on a crafted loss function which was formerly based on the MPC's objective function, and use a learned loss instead.

In the following, embodiments of the present invention are described with reference to the drawings.

The adaptation of video bitrate and resulting quality to the available throughput is handled by the adaptive bitrate control mechanism of the video players.

ABR control mechanisms relies on either hand-crafted or learned-based rules to select chunks. Here, a chunk may be a portion of a video encoded at a predetermined bitrate.

Although many researches have been performed on the study of these rules for chunk packet selection, a limitation of these previous works is in the time scale considered in the chunk selection. Indeed, previous works have been focusing on the selection of the immediately following chunk as it relates to the problematic that video players have: "which chunk should be requested next."

However, having this short-sighted view result in non-optimal QoE as it does not allow to anticipate degradation of network access and only provide a response to observed degradations events.

As an illustration, one could consider the case of a user watching video in a car. At a given time, a user may enjoy a high-quality network access allowing him to watch high quality videos. However, when the car enters a tunnel, the available throughput decreases significantly.

In this context, the traditional "short-sighted" video player has no other choice than largely dropping the video quality to avoid stalling as at the time at which the video players measure the drop in throughput, the player is left without any other options.

Performing such short sighted chunk selection mechanism is problematic as it results in less opportunities for considering different quality adaptations in challenging network conditions. To address this challenge, it is proposed to perform chunk selection based on long-term throughput prediction.

If the example introduced earlier of a car entering a tunnel is considered, the general idea of proposed method is that if the player could have anticipated that throughput would have drop to a large extent before it occurred, it would have been able to identify other solutions.

For example, it would have been possible to use the high throughput available before it degrades to buffer the video at a faster rate.

This can eventually be done at the cost of a slight drop in quality, but in the end would have allowed high quality videos to be watched while the car is in the tunnel with limited network access.

By performing chunk selection based on long-term throughput prediction, quality of experience of users is improved in challenging network conditions by providing higher and most constant quality to users.

The proposed algorithm is executed on the device and aims at defining a long term chunk request scheduling strategy.

In the same way as traditional ABR control schemes, the proposed algorithm takes as input the media presentation description (MPD) which provides information on the available quality levels for a video.

FIG. 1 depicts the keys steps of the proposed methods, and are the following.

1) The temporal variation of throughput for a duration up to T seconds is estimated (the value of T is discussed below).
2) Scheduling for an optimal chunk request for this duration of T seconds is identified (FIG. 2).
3) The first chunk of the identified optimized path is requested.

Then, the algorithm returns to step 1 and re-estimate of temporal throughput variations for a duration up to T seconds.

The algorithm performs this process in loop until either the video playback reaches its end, or the user quit watching the video.

FIG. 3 is a diagram illustrating an example of a hardware configuration of a video player 10 according to an embodiment of the present invention. The video player 10 illustrated in FIG. 3 includes, for example, a drive device 100, an auxiliary storage device 102, a memory device 103, a central processing unit (CPU) 104, and an interface device 105, which are mutually connected via a bus B.

A program for implementing processing by the video player 10 may be provided by a recording medium 101, such as a CD-ROM. When the recording medium 101 on which the program is stored is set in the drive device 100, the program is installed in the auxiliary storage device 102 from the recording medium 101 through the drive device 100. However, the installation of the program need not be performed by the recording medium 101, and the program may be downloaded from another computer via a network. The auxiliary storage device 102 stores the installed program and stores necessary files, data, and the like.

The memory device 103 reads out and stores a program from the auxiliary storage device 102 when an instruction to start a program is issued. The CPU 104 performs a function of the video player 10 according to a program stored in the memory device 103. The interface device 105 is used as an interface for connecting to a network.

FIG. 4 is a diagram illustrating an example of a functional configuration of the video player 10 according to an embodiment of the present invention. As illustrated in FIG. 4, the video player 10 includes, for example, a throughput predictor 11; a bitrate controller 12; a communication unit 13; a buffer 14. Each of these functional units is implemented by a process executed by the CPU 104 in accordance with one or more programs installed in the video player 10. Namely, each of these functional units is implemented by cooperation between a hardware resource of the video player 10 and a program (software) installed in the video player 10. Note that the communication unit 13 may include a transmitter and a receiver.

In the following, an example of a procedure executed by the video player 10 is described. FIG. 5 is a flowchart illustrating an example of a procedure executed by the video player 10.

Before starting the optimization procedure, the value of T needs to be defined. T may be a user-defined parameter. The larger the value of T, the higher the performance. However, increasing its value result in an increase in computational cost. Therefore, a trade-off between computational cost and quality improvement should be performed. In simulations, a value of T of 20 seconds shows significant quality improvement, but other values could be considered as well.

In step S101 of FIG. 5, the throughput predictor 11 predicts a future throughput for subsequent T seconds. Prediction of throughput is a challenging task, and have received lots of attention.

By applying a technique from among different techniques such as the mean of arithmetic mean, harmonic mean, deep neural networks, or hidden markov models, the feature throughput can be predicted.

However, in these method only throughput immediately following was predicted. Therefore, in this work it is proposed to leverage the work on time-series forecasting to predict throughput over larger time frames.

As the prediction method used in the throughput predictor 11, different approaches can be considered such as the use of auto-regressive models such as autoregressive integrated moving average (ARIMA), or advanced-learning based techniques.

In the following, as the prediction method used in the throughput predictor 11, a transformer-based deep neural network throughput prediction algorithm (Non Patent Literature 5) is suggested but alternative models could be considered as well.

Using this model, the throughput predictor 11 predict future throughput for the upcoming T seconds by using past throughput values.

In step S102 of FIG. 5, the bitrate controller 12 configures a search space for finding an optimum quality adaptation schedule for the time interval of the upcoming T seconds.

FIG. 2 is a diagram illustrating an example of a search space for finding an optimum quality adaptation schedule. In the example of FIG. 2, the horizontal axis of the search space represents the time axis, and the vertical axis of the search space represents a quality level.

In the example of FIG. 2, in addition to the current time t and t+1, t+2, . . . , t+4 corresponding to the time interval of the upcoming T seconds, t−2 and t−1 that are past times are included in the search space. As the quality levels of the video, 6 different quality levels ranging from 144 p to 1080 p are available. Namely, as illustrated in the example of FIG. 2, the bitrate controller 12 configures the search space by configuring, for each unit time (T/4 in the example of FIG. 2), different quality levels (from 144 p to 1080 p in the example of FIG. 2) as the vertical axis. In the example of FIG. 2, the upcoming T seconds are divided into 4 unit times. However, the embodiment is not limited to this example. The upcoming T seconds may be divided into more than 4 unit times, or the upcoming T seconds may be divided into less than 4 unit times. Furthermore, the quality levels are not limited to the 6 quality levels, and the quality levels may be more than 6 quality levels, or the quality levels may be less than 6 quality levels.

In the example of FIG. 2, the line segment between t−2 to t indicates previous chunk selected by the bitrate controller 12. At the time t, it is necessary for the bitrate controller 12 to select the quality level of the chunk for the subsequent unit of time t+1. To this aim, in step S103 of FIG. 5, the bitrate controller 12 selects different paths in the search space for the next T seconds that correspond to different quality adaptation schedules, as the targets for evaluation of QoE.

In the example of FIG. 2, three paths are illustrated that are expected to provide QoE1, QoE2, and QoE3, respectively, as the different paths in the search space.

In step S104 of FIG. 5, the bitrate controller 12 uses the future throughput predicted in step S101 and a QoE model to evaluate the QoE of a given path. As the QoE model, the model described in Non Patent Literature 6 can be used. However, it should be noted that others QoE models such as the ones described in ITU-T Rec. P.1203 or ITU-T Rec. P.1204 could be used as well.

These standardized model are available in different modes making use of different type of information from low complexity models which only uses parameters such as bitrate, frame-rate, and resolution up to higher complexity models that also make uses of bitstream or even pixel information.

The bitrate controller 12 predicts the QoE of a given path based on the throughput in the previous P seconds and the following T seconds.

Taking into account previously downloaded chunks allows address the aspects of temporal smoothness of quality.

In the example depicted in FIG. 2, chunk duration is set to 1 second, P and T are respectively set to 2 and 4 seconds.

Regarding future chunk request, in the FIG. 2, three different paths are depicted but all quality adaptations among the available quality levels should be considered and evaluated in terms QoE allowing to identifying the path providing the highest QoE.

The process of computation of the QoE of a given path is done as follows: every chunk in a path correspond to a different quality level that can be characterized by the resolution r, the video bitrate $b_v$, the frame rate f, and the audio bitrate $b_a$.

Using the characteristics of each chunk from a given path, it is possible to obtain per-second values of each of these quality-related parameters.

Then, based on the model of Non Patent Literature 6, the video, the audio, and the audio-visual quality are estimated on a per-second basis using Equations 1, 4 and 5 respectively.

[Math. 1]

$$Q_v = X + \frac{1-X}{1+\left(\frac{b_v}{Y}\right)^{v_1}} \quad \text{(Equation 1)}$$

[Math. 4]

$$Qa = a_1 \times \frac{1-a_1}{1+\left(\frac{b_a}{a_2}\right)^{a_3}} \quad \text{(Equation 4)}$$

[Math. 5]

$$Q_{av} = m_1 + m_2 \times Q_a + m_3 \times Q_v + m_4 \times Q_a \times Q_v \quad \text{(Equation 5)}$$

Note that, in Equation 1, X and Y are defined by Equations 2 and 3.

[Math. 2]

$$X = \frac{4 \times (1 - \exp(-v_3 \times f)) \times rs}{v_2 + rs} \quad \text{(Equation 2)}$$

[Math. 3]

$$Y = \frac{v_4 \times rs + v_6 \times \log_{10}(v_7 \times f + 1)}{1 - \exp(-v_5 \times rs)} \quad \text{(Equation 3)}$$

Temporal aggregation of the per-second coding quality-related scores into a per-path QoE score is given by Equations 6-9.

[Math. 6]
$$Q_c = \frac{\sum_{t=0}^{P+T} w_1(u) \times w_2(Q_{av}(t)) \times Q_{av}(t)}{\sum_{t=0}^{P+T} w_1(u) \times w_2(Q_{av}(t))} \quad \text{(Equation 6)}$$

[Math. 7]
$$w_1(u) = t_1 + t_2 \times \exp\left(\frac{u}{t_3}\right) \quad \text{(Equation 7)}$$

[Math. 8]
$$w_2(Q_{av}(t)) = t_4 - t_5 \times Q_{av}(t) \quad \text{(Equation 8)}$$

[Math. 9]
$$u = \frac{t}{P+T} \quad \text{(Equation 9)}$$

Finally, the impact of stalling is taken into account using Equation 10.

[Math. 10]
$$Q = 1 + (Q_c - 1) \times \exp\left(-\frac{n_b}{s_1}\right) \times \exp\left(-\frac{t_b}{(P+T) \times s_2}\right) \times \exp\left(-\frac{a_b}{(P+T) \times s_3}\right) \quad \text{(Equation 10)}$$

In this equation, $n_b$ is the number of stalling experienced in the considered path, $t_b$ is the total stalling duration, and $a_b$ is the average duration between stalling events.

In these equations, $v_{1-7}$, $a_{1-3}$, $m_{1-4}$, $t_{1-5}$, and $s_{1-3}$ are model parameters that were obtained using regression using subjective experiment databases.

If L is the number of quality levels, and N is the number of chunks to be downloaded in the following T seconds, $L^N$ different paths needs to be compared.

Considering the computational cost, restrictions can be applied in the considered quality adaptations to decrease the number of paths that needs to be evaluated.

A candidate optimization can be to only allow an increase or decrease of quality by only A levels.

For example, if the example of FIG. 2 is considered, with A=1, at a time t the last requested chunk was the quality level corresponding to 360 p.

At time t+1, only a quality level 480 p, 360 p and 240 p can be considered to be requested.

At time t+2, depending on the choice performed at t+1 quality values can range from 720 p to 144 p.

Doing such optimization results in a decrease of the search space to $(2 \times A+1)^N$ comparisons, while it also have the benefit of enforcing smooth quality adaptations which also result in higher QoE and would have been selected even a full search over $L^N$ path was performed.

In step S105 of FIG. 5, the bitrate controller 12 selects the path providing the highest QoE from among the $L^N$ paths in the search space. Note that, as described above, in the case where only an increase or decrease of quality by only A levels is allowed, the bitrate controller 12 selects the path providing the highest QoE from among the $(2 \times A+1)^N$ paths.

Regarding the special case of video startup, as past throughput data is not available, it may not be possible to predict future throughput for the next T seconds. In this case, different alternatives are possible.

1) The bitrate controller 12 may choose to start with the lowest quality level allowing fast initial loading.
2) The bitrate controller 12 may let a user chose an initial quality level.
3) The bitrate controller 12 may estimate future throughput based on previous videos watched by the users.

For example, in the case of a user finishing watching a video and jumping to a new one, the information about available throughput measured in the previous video can be used to predict the throughput in the following video allowing start video with an appropriate quality level.

Similarly, information such as throughput measured in the loading phase of a web interface can be used as clues to predict the available throughput to the user and select an appropriate initial quality level.

In step S106 of FIG. 5, the bitrate controller 12 requests a chunk through the communication unit 13.

After selecting, in step S105, the optimal path that is expected to provide the highest QoE, in step S106, the bitrate controller 12 requests the chunk with the quality level corresponding to that of the immediately following chunk in the selected path through the communication unit 13.

For example, suppose that, in FIG. 2, the path which result in a QoE value QoE2 provide the highest QoE to the users.

In this case, the bitrate controller 12 requests the chunk corresponding to the quality level 360 p through the communication unit 13.

Subsequently, in step S106, the communication unit 13 obtains the chunk with the requested quality level through a network, such as the Internet, and stores the chunk in the buffer 14. As a result, the video player 10 can provide higher and most constant quality to users.

In step S107 of FIG. 5, the bitrate controller 12 determines whether th end of the video is reached, or the user stops watching the video.

Upon determining, in step S107, that the end of the video is reached or the user stops watching the video (S107: YES), the bitrate controller 12 ends the procedure.

Upon determining, in step S107, that the end of the video is not reached and that the user does not stop watching the video (S107: NO), the procedure returns to S101, and the throughput predictor 11 uses measured throughput from chunks t−1 to t+1 to predict throughput from t+2 up to t+5.

In steps S102 to S105, the bitrate controller 12 re-computes an optimal path between t+1 and t+5, and the bitrate controller 12 selects a chunk to be downloaded at t+2.

This process is repeated in a loop until either the user stop watching, or the player reach the end of the video.

It is shown, in the embodiment, how long-term throughput prediction from time-series analysis can be used in adaptive bitrate control schemes to perform long-term chunk request scheduling. This allows going from traditional narrow-sighted players to player capable of anticipating variation in throughput and provide higher quality to the users.

In the embodiment, it is shown that state-of-the-art quality of experience model can be used to evaluate the quality of a given chunk selection path. Doing so provides an improvement of the user experience as it leverage knowledge on QoE modeling to define a proper quality adaptation strategy.

It is shown, in the embodiment, that to reduce computational complexity, quality adaptations can be constrained to not increase nor decrease by a user-defined threshold. Doing so enforce the temporal smoothness of quality while decreasing significantly the computational cost.

To improve the overall experience of users watching videos over network with fluctuating throughput conditions, in the embodiment, a method that leverage long-term throughput prediction to define chunk request schedule path is described. Contrarily to previous approaches that define which chunk to request on a per-chunk basis, the proposed method estimate future throughput in a long-term manner and estimate which chunk scheduling path provides the highest experience to the users. The identified path is updated periodically to take into account new measurements about throughput and allow continuous updating of the chunk request scheduling path.

While the embodiments of the present invention are described in detail above, the present invention is not limited to the above-described embodiments, and various modifications and variations are possible within the scope of the gist of the present invention set forth in the claimed.

The invention claimed is:

1. A video player comprising:
a transmitter;
a receiver;
a processor; and
a memory that includes instructions, which when executed, cause the processor to execute the following steps:
predicting a future throughput for a future first time interval by using a past throughput value, the future first time interval including m future unit time intervals;
configuring a search space for identifying a quality adaptation schedule, the search space being defined by k quality values, and a second time interval including a current unit time interval, the m future unit time intervals, and n past unit time intervals;
extracting a plurality of paths in the search space, each path of the plurality of paths being obtained by selecting one quality level from the k quality levels for each unit time interval included in the second time interval;
estimating, based on the future throughput, a quality of experience value for each path of the extracted plurality of paths;
identifying a path corresponding to a highest quality of experience value from among the estimated quality of experience values, as the quality adaptation schedule;
determining, based on the quality adaptation schedule, a quality value of a chunk to be requested for the future unit time interval subsequent to the current unit time interval;
requesting the chunk with the determined quality value through the transmitter; and
receiving the chunk with the determined quality value through the receiver.

2. The video player according to claim 1, wherein the extracting extracts $(2\times A+1)^m$ paths in the m future unit time intervals by allowing, as a difference between quality levels in two adjacent unit time intervals, only the difference that is less than or equal to A levels.

3. The video player according to claim 1, wherein the predicting the future throughput uses a throughput measured in the n past unit time intervals to predict the throughput for the m future unit time intervals.

4. The video player according to claim 1, wherein the predicting the future throughput uses a throughput of another video that is previously watched or a preset low throughput.

5. The video player according to claim 1, wherein the estimating the quality of experience value uses a predetermined quality of experience model to evaluate the quality of experience value.

6. A video playback method executed by a computer, the method comprising:
predicting a future throughput for a future first time interval by using a past throughput value, the future first time interval including m future unit time intervals;
configuring a search space for identifying a quality adaptation schedule, the search space being defined by k quality values, and a second time interval including a current unit time interval, the m future unit time intervals, and n past unit time intervals;
extracting a plurality of paths in the search space, each path of the plurality of paths being obtained by selecting one quality level from the k quality levels for each unit time interval included in the second time interval;
estimating, based on the future throughput, a quality of experience value for each path of the extracted plurality of paths;
identifying a path corresponding to a highest quality of experience value from among the estimated quality of experience values, as the quality adaptation schedule;
determining, based on the quality adaptation schedule, a quality value of a chunk to be requested for the future unit time interval subsequent to the current unit time interval;
requesting the chunk with the determined quality value; and
receiving the chunk with the determined quality value.

7. The video playback method executed by a computer according to claim 6, wherein the extracting extracts $(2\times A+1)^m$ paths in the m future unit time intervals by allowing, as a difference between quality levels in two adjacent unit time intervals, only the difference that is less than or equal to A levels.

8. The video playback method executed by a computer according to claim 6, wherein the predicting the future throughput uses a throughput measured in the n past unit time intervals to predict the throughput for the m future unit time intervals.

9. The video playback method executed by a computer according to claim 6, wherein the predicting the future throughput uses a throughput of another video that is previously watched or a preset low throughput.

10. The video playback method executed by a computer according to claim 6, wherein the estimating the quality of experience value uses a predetermined quality of experience model to evaluate the quality of experience value.

11. A non-transitory computer readable recording medium storing a video playback program, wherein, when the video playback program is executed by a computer, the program causes the computer to execute the following steps:
predicting a future throughput for a future first time interval by using a past throughput value, the future first time interval including m future unit time intervals;
configuring a search space for identifying a quality adaptation schedule, the search space being defined by k quality values, and a second time interval including a current unit time interval, the m future unit time intervals, and n past unit time intervals,
extracting a plurality of paths in the search space, each path of the plurality of paths being obtained by selecting one quality level from the k quality levels for each unit time interval included in the second time interval;

estimating, based on the future throughput, a quality of experience value for each path of the extracted plurality of paths;

identifying a path corresponding to a highest quality of experience value from among the estimated quality of experience values, as the quality adaptation schedule;

determining, based on the quality adaptation schedule, a quality value of a chunk to be requested for the future unit time interval subsequent to the current unit time interval;

requesting the chunk with the determined quality value; and receiving the chunk with the determined quality value.

12. The computer-readable non-transitory recording medium according to claim 11 wherein the video playback program further comprises:

the extracting extracts $(2 \times A+1)^m$ paths in the m future unit time intervals by allowing, as a difference between quality levels in two adjacent unit time intervals, only the difference that is less than or equal to A levels.

13. The computer-readable non-transitory recording medium according to claim 11 wherein the video playback program further comprises:

the predicting the future throughput uses a throughput measured in the n past unit time intervals to predict the throughput for the m future unit time intervals.

14. The computer-readable non-transitory recording medium according to claim 11 wherein the video playback program further comprises:

the predicting the future throughput uses a throughput of another video that is previously watched or a preset low throughput.

15. The computer-readable non-transitory recording medium according to claim 11 wherein the video playback program further comprises:

the estimating the quality of experience value uses a predetermined quality of experience model to evaluate the quality of experience value.

* * * * *